May 22, 1951

J. S. BROWN ET AL 2,553,547

CAN BODY SIDE SEAM SOLDERING MACHINE WITH
IMPROVED WIPER MECHANISM

Filed Dec. 9, 1947

INVENTORS
James S. Brown
Julius Melzer
BY Ivan D. Hornburgh
Charles H. Erne
ATTORNEYS May 22, 1951 J. S. BROWN ET AL 2,553,547
CAN BODY SIDE SEAM SOLDERING MACHINE WITH
IMPROVED WIPER MECHANISM
Filed Dec. 9, 1947 2 Sheets-Sheet 2

INVENTORS
James S. Brown
Julius Melzer
BY Ivan D. Thornburgh
Charles H. Erne
ATTORNEYS Patented May 22, 1951

2,553,547

UNITED STATES PATENT OFFICE 2,553,547

CAN BODY SIDE SEAM SOLDERING MACHINE WITH IMPROVED WIPER MECHANISM

James S. Brown, Scarsdale, and Julius Melzer, Bellaire, N. Y., assignors to American Can Company, New York, N. Y., a corporation of New Jersey Application December 9, 1947, Serial No. 790,492

5 Claims. (Cl. 113—97)

1

The present invention relates to machines for soldering or otherwise coating articles such as container bodies or the like and has particular reference to an improved wiper or scraper mechanism for removing excess solder or other coating material from freshly coated areas of can bodies or other articles.

An object of the invention is the provision in a machine for soldering or otherwise coating articles such as container bodies or the like of an improved wiper or scraper mechanism wherein the wiper or scraper mechanism is formed in such a manner as to eliminate the throwing of loose particles of the coating material or other foreign matter so that the interiors of the bodies are kept free of contamination by such particles or other foreign matter.

Another object is the provision of such a wiper or scraper mechanism wherein all parts of the mechanism are stationary and of simple construction so that there are no moving parts to be operated through driving mechanisms which thus reduces maintenance costs and provides for more efficient operation.

Another object is the provision of such a wiper mechanism wherein can bodies or other articles of various diameters may be readily accommodated and wherein the width of the wiped or scraped area may be readily controlled, by a slight adjustment of the stationary parts of the mechanism.

Numerous other objects and advantages of the invention will be apparent as it is better understood from the following description, which, taken in connection with the accompanying drawings, discloses a preferred embodiment thereof.

Referring to the drawings.

Figure 1:
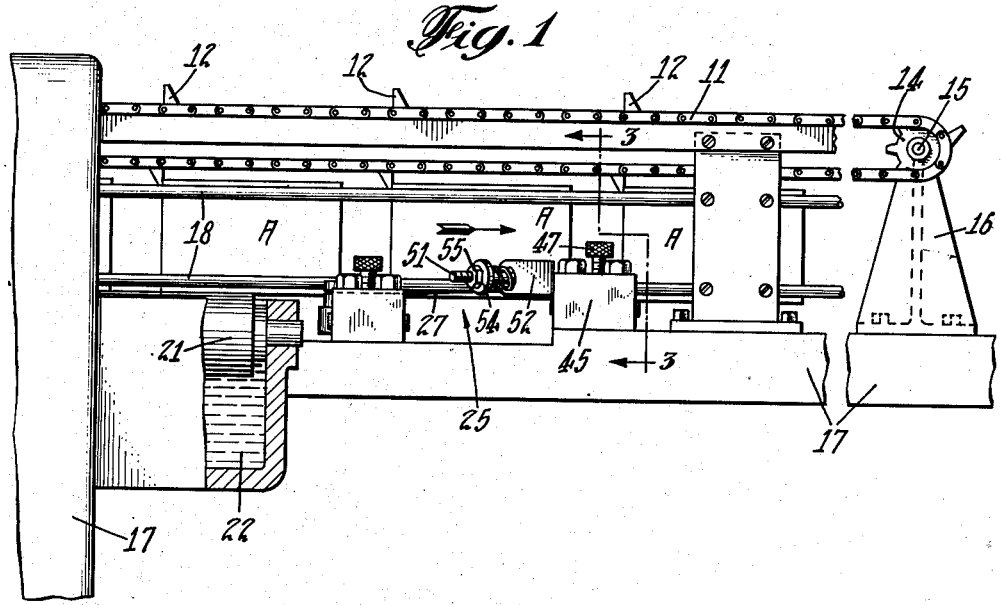
Figure 1 is a side elevation of a can body side seam soldering mechanism embodying the instant invention, with parts broken away and parts shown in section.

As a preferred embodiment of the instant invention the drawings illustrate the wiper section of a can body soldering machine in which open end sheet metal can bodies A having longitudinal side seams B are conveyed along a straight line path of travel in spaced and timed order in a continuous procession and in endwise relation for the soldering of the seams and for the wiping of excess solder therefrom although the invention is equally well adapted to fibre or other containers and to materials other than solder, such as for example, glue, cement, plastic materials, asphalt, and others. The can bodies are propelled along this straight line path of travel preferably by an endless chain conveyor 11 (Fig. 1) having projecting feed dogs 12 secured thereto at spaced intervals for propelling engagement with an edge of the bodies. This chain conveyor operates over a sprocket 14 mounted on a drive shaft 15 journaled in bearings brackets 16 secured to a frame 17 which constitutes the main frame of the machine. The shaft may be rotated in any suitable manner.

The can bodies A while propelled by the conveyor 11 are supported in a horizontal horn comprising a plurality of longitudinal support bars 18 which are carried in the main frame 17. These support bars engage the outside surface of the bodies and permit of sliding the bodies endwise therealong.

During the travel of the bodies along the horn bars 18 the side seams of the bodies are passed over a suitable soldering mechanism such as for example, a usual solder roller 21 which is rotated in any suitable manner in a solder bath 22 carried on the machine frame 17. The solder roll engages against the seam of a body A as it is moved endwise therealong and carries molten solder up onto the seam to effect the soldering operation.

Following the soldering operation any excess of the freshly applied solder on the seams is wiped off by a stationary wiper device 25 which is disposed just beyond the solder bath 22 and adjacent the path of travel of the can bodies. This wiper device comprises a pair of taut, angularly disposed and crossed wires, threads, or wirelike or threadlike members 26, 27 (Figs. 2, 3, 4 and 5) made of any suitable metallic or nonmetallic material and against which the freshly soldered side seam portions of the can bodies A engage as the bodies advance with the conveyor 11.

One end of each wire is elevated in relation to its opposite end, as shown in the drawings. For this purpose the lower end (that end nearest the solder bath 22) of the wire 26 is secured to a fixed post 31 (Figs. 2 and 3) secured in an adjustable arm 32 mounted on a pivot pin 33 carried in a stationary bracket 34 bolted to the machine frame 17 along one side of the path of travel of the bodies. One bolt operates in an elongated slot 30 in the bracket so that the bracket may be turned to alter the angle of the wire 26. The arm is held stationary in an adjusted position by a pair of adjusting screws 35, 36 secured in the bracket, one on each side of the pivot pin 33 and engaging against the arm for proper adjustment of the arm.

The wire 26 extends from the post 31 around a grooved guide pulley 37 carried on a stud 38 secured in the outer end of the arm 32. From the guide pulley the wire extends upwardly at an angle and across and under the path of travel of the can bodies at an angle thereto thus forming an inclined diagonal straight line wiper element. At its upper end, the wire passes over a grooved guide pulley 41 mounted on a stud 42 secured in the outer end of an adjustable arm 43 mounted on a pivot pin 44 carried in a stationary bracket 45 secured to the machine frame 17 on the opposite side of the path of travel of the can bodies and above the level of the bracket 34. Like the bracket 34, this bracket 45 may be turned on its bolts to alter the angle of the wire 26. The rocker arm 43 is held stationary in an adjusted position by a pair of adjusting screws 46, 47 secured in the bracket 45 one on each side of the pivot pin 44 and engaging against the arm for proper adjustment thereof.

The wire 26 is held in a taut condition and for this purpose the terminal end of the wire is secured in the inner end of a tension adjusting rod 51 carried in a lug 52 formed on a side of the bracket 45. The outer end of the rod 51 is surrounded by a compression spring 53 which is interposed between the lug 52 and a washer 54 and tension adjusting nut 55 threadedly secured to the outer end of the rod 51. By adjusting the nut 55 the tautness of the wire 26 may be controlled.

In a similar manner the cooperating wiper wire 27, at its lower end (the end nearest the solder bath 22), is secured to a fixed post 61 secured in an adjustable arm 62 mounted on a pivot pin 63 carried in a stationary bracket 64 bolted to the machine frame 17 on the same side of the machine as the elevated bracket 45 is bolted to. Provision is made in this bracket, like the brackets 34, 45 for turning it to alter the angle of the wire 27. The arm 62 is held stationary in an adjusted position by a pair of adjusted screws 65, 66 secured in the bracket one on each side of the pivot pin 63 and engaging against the arm for proper adjustment thereof.

Figure 5:
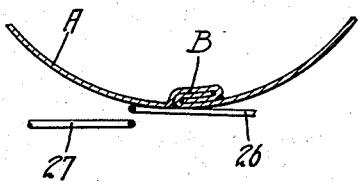
Fig. 5 is a sectional view taken substantially along the line 5—5 in Fig. 2 and drawn to an enlarged scale, and showing the relation of certain of the wiper parts to a can body being wiped.

This wire 27 extends from the post 61 around a grooved guide pulley 67 carried on a stud 68 secured in the outer end of the arm 62. From the guide pulley, the wire extends upwardly at an angle and across and under the path of travel of the can bodies and the wire 26 at an angle thereto but in spaced relation to the wire 26 as best shown in Fig. 5, thus forming an inclined diagonal straight line wiper element for cooperation with the wire 26. The two crossed and spaced apart wires 26, 27 form a wedge shaped wiper device.

At its upper end, the wire 27 passes over a grooved guide pulley 71 mounted on a stud 72 secured in the outer end of an adjustable arm 73 mounted on a pivot pin 74 carried in a stationary bracket 75 secured to the machine frame 17 on the same side of the path of travel as the bracket 34 but at the higher level of the bracket 45. This bracket 75 like the others may be turned to alter the angle of the wire. The arm 73 is held stationary in an adjusted position by a pair of adjusting screws 76, 77 secured in the bracket 75 one on each side of the pivot pin 74 and engaging against the arm for proper adjustment thereof.

Like the wire 26, the wire 27 is held in a taut condition and for this purpose the terminal end of the wire is secured in the inner end of a tension adjusting rod 81 carried in a lug 82 formed on a side of the bracket 75. The outer end of the rod 81 is surrounded by a compression spring 83 which is interposed between the lug 82 and a washer 84 and tension adjusting nut 85 threadedly secured to the outer end of the rod 81. By adjusting this nut 85 the tautness of the wire 27 may be controlled independently of the wire 26.

Figure 2:
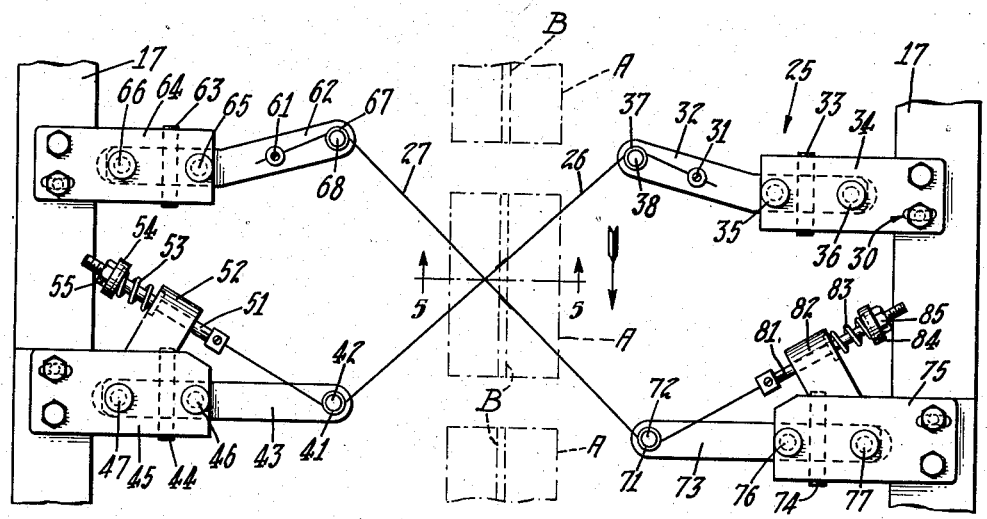
Fig. 2 is a top plan view of the solder wiper device used in the mechanism shown in Fig. 1, with parts broken away and with can bodies shown in dot and dash lines, the view being turned through an angle of ninety degrees.
Figure 3:
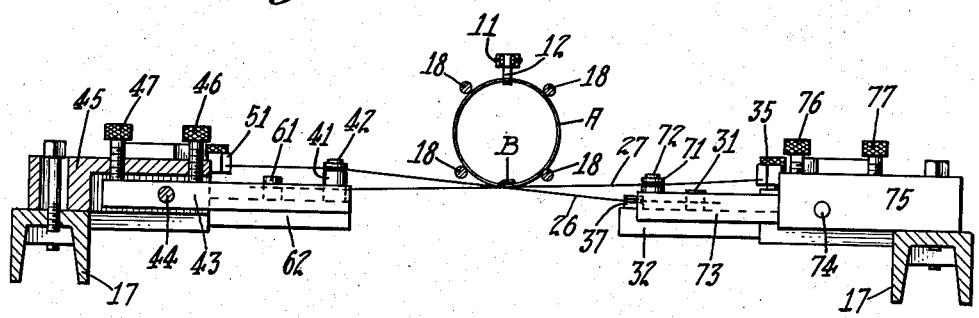
Fig. 3 is a transverse section taken substantially along the broken line 3—3 in Fig. 1.

In operation, a can body A with its freshly soldered side seam B, as it approaches the wiper device engages and rides up onto the two stationary crossed and inclined diagonal wiping elements 26, 27 in tangential engagement therewith and passes across these elements for the wiping operation. In effect the wires engage the body across its freshly soldered side seam in spaced relation, one wire being slightly in advance of the other as best shown in Fig. 2. While both wires are in the path of travel of the side seam the flexibility of each wire is sufficient to permit the necessary shifting of the wire, when engaged by the advancing can body, to position it below the body thus permitting the seam to slide along the wire. This initial shifting is made easier by reason of the angular position of the wires relative to the path of travel of the can body seam. This shifting is also aided by the position of one end of each wire being higher than its opposite end. In other words the wire and the body wall engage in a glancing position.

Figure 4:
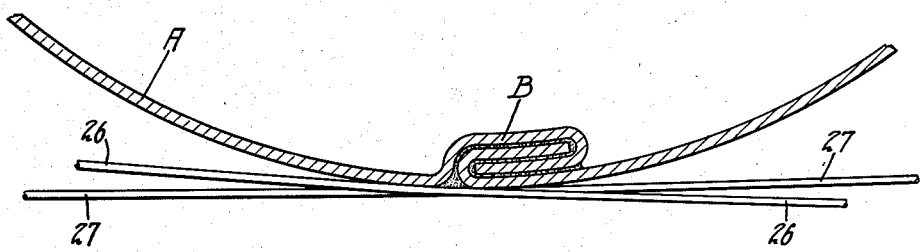
Fig. 4 is an enlarged sectional view of the side seam of a can body being wiped by parts of the wiping device, with parts broken away.

During this passage of the body across the wires 26, 27, the wires are bowed down slightly as each wire is engaged by the body and the engaged part of the wire bends into the curved shape of the body as best shown in Fig. 4 and exerts a pressure against the body with the result that the line of contact of the wire with the body is a portion of an elliptical curve, exemplified by the line defined by the angular intersection of a plane and a cylinder. With the two wires thus engaging the body in the form of a normally disposed chevron or V as viewed in plan, one wire scrapes across the freshly soldered side seam in one angular direction, and the other wire scrapes across the opposite side of the seam in the opposite angular direction. Thus any excess solder that may be on the seam is brushed inwardly toward the center of the seam where it drops off and falls to any suitable place of deposit.

In this manner the soldered side seam is left in a smooth condition with a uniformly thick film of solder adhering thereto. Since the wiper elements 26, 27 are of a stationary nature, except for the slight bending action, there is no throwing of solder pellets or other foreign matter therefrom and therefore the interior surfaces of the preceding and succeeding can bodies in the procession of bodies moving through the machine are kept free from contamination from this source. If desired such a device may be used for spreading material over a predetermined area of a can body or other article as well as for removing excess material.

By an adjustment of the arms 32, 43, 62, 73 through their adjusting screws, the angle of inclination of the wires 26, 27 may be changed so that the width of the area to be wiped may be altered in accordance with the width of the solder applied to the can body, and to also accommodate can bodies of various diameters.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a machine for removing excess solder from the side seams of sheet metal can bodies, the combination of means for propelling a can body having a freshly soldered side seam along a predetermined path of travel longitudinally of the side seam, and a pair of stationary wires extending partially into the path of the advancing soldered side seam until engaged by the seam and thereby bowed into conformity with the shape of the body at said seam, each of said wires being inclined and disposed diagonally across said path of the side seam in directions substantially opposite to those of the other wire so that said wires wipe excess solder from the side seam in opposite transverse directions along the length of the advancing side seam.

2. In a machine for removing excess solder from the side seams of sheet metal can bodies, the combination of means for propelling a can body having a freshly soldered side seam along a predetermined path of travel longitudinally of the side seam, a pair of stationary wires extending partially into the path of the advancing soldered side seam until engaged by the seam and thereby bowed into conformity with the shape of the body at said seam, each of said wires being inclined and disposed diagonally across said path in directions substantially opposite to those of the other wire so that said wires scrape excess solder from said advancing side seam in opposite transverse directions along the length of said seam, and adjustable means for anchoring the ends of said wires at the desired degrees of inclination and diagonal disposition relative to the path of the side seam.

3. In a machine for removing excess solder from the side seams of sheet metal can bodies, the combination of means for propelling a can body having a freshly soldered side seam along a horizontal path of travel longitudinally of the side seam, a pair of stationary wires extending partially into the path of the advancing soldered side seam until engaged by the seam and thereby bowed into conformity with the shape of the body at said seam, each of said wires being inclined and disposed diagonally across said path of the side seam in directions opposite to those of the other wire so that said wires wipe the excess solder from the side seam in opposite transverse directions along the length of said advancing side seam, anchoring means for holding the ends of said wire, means for shifting said anchoring means for changing the degree of diagonal angularity of each wire relative to said path of the side seam, and means mounted on said anchoring means for vertically positioning each end of each wire to vary the inclination of each wire relative to said path of travel of the side seam.

4. In a machine for removing excess solder from the side seams of sheet metal can bodies, the combination of means for propelling a can body having a freshly soldered side seam along a predetermined path of travel longitudinally of the side seam, a stationary wire for engaging and wiping excess solder from said side seam, said wire being disposed diagonally across and extending partially into said path of the soldered side seam, and yieldable means connected with said wire for holding it taut as it engages and bends into conformity with the shape of the soldered area of the side seam during the wiping operation.

5. A solder wiper for removing excess solder from a can body side seam during relative horizontal movement between said wiper and the seam, comprising in combination a pair of crossed wires for wiping excess solder from the side seam of a can body, anchoring means for holding the wires taut at a predetermined angle to each other, devices mounted on said anchoring means for inclining each wire relative to the horizontal and in a direction opposite to the other wire, and means for effecting relative horizontal movement between said side seam and said angularly disposed wires, said movement being longitudinally of said side seam and across said wires successively at points removed from the position at which said wires cross, each of said wires engaging said side seam with its inclination and diagonal disposition relative to said seam opposite to those of the other wire so that the wiping action proceeds in opposite transverse directions along the seam during said relative movement.

JAMES S. BROWN.
JULIUS MELZER.

REFERENCES CITED

The following references are of record in the file of this patent:

UNITED STATES PATENTS

| Number | Name | Date |
| --- | --- | --- |
| 625,990 | Steward | May 30, 1899 |
| 704,256 | Hodgson | July 8, 1902 |
| 832,301 | Eldridge | Oct. 2, 1906 |
| 1,299,016 | Opitz | Apr. 1, 1919 |
| 1,734,710 | Borchert | Nov. 5, 1929 |
| 2,432,834 | Taylor | Dec. 16, 1947 |